Aug. 23, 1932.  C. E. NORTH  1,872,795
PROCESS OF HEATING MILK
Filed Aug. 3, 1928
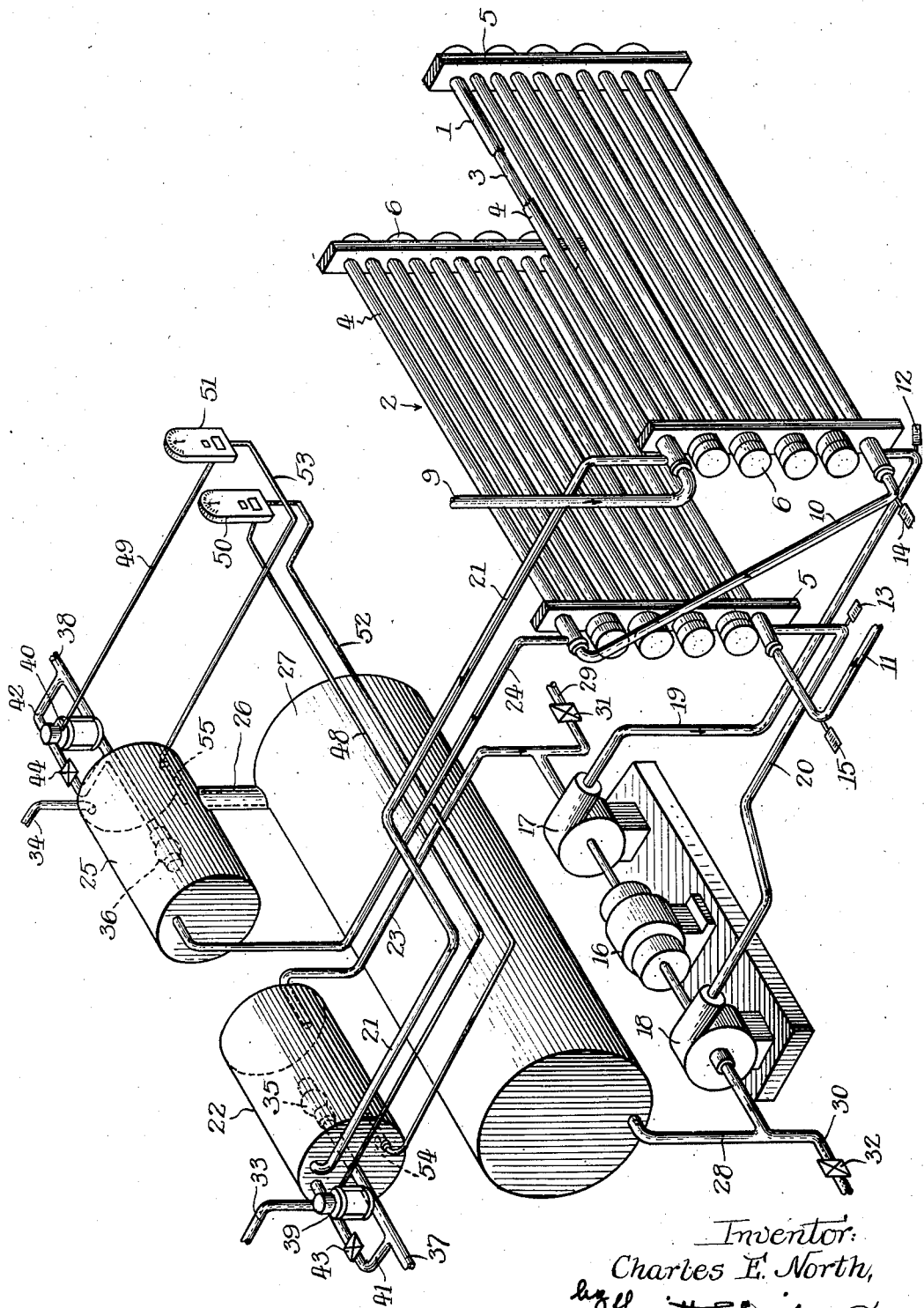
Inventor:
Charles E. North,
by Hewitt  Dixon Atty.

Patented Aug. 23, 1932

1,872,795

UNITED STATES PATENT OFFICE

CHARLES E. NORTH, OF MONTCLAIR, NEW JERSEY, ASSIGNOR TO THE CREAMERY PACKAGE MFG. COMPANY, OF CHICAGO, ILLINOIS, A CORPORATION OF ILLINOIS

PROCESS OF HEATING MILK

Application filed August 3, 1928. Serial No. 297,357.

The invention relates to the heating process used in the pasteurizing treatment of milk, and is more particularly related to the process of heating the milk to a predetermined degree of temperature preliminary to holding the milk at that temperature for a specific period of time.

The principal object of the invention is to provide a milk heating process by which the automatic maintenance of a final temperature in the milk being heated may be accomplished within limits of variation from the predetermined uniform final degree of temperature so narrow as to be without consequence to precise uniformity in qualitative effect upon the milk receiving the heat treatment.

Another object is to provide a process of heating milk in which the milk stream is heated in successive stages by separate heating mediums supplied from sources separately controlled as to temperature.

A further object is to provide a process for restoring to a heating medium the heat given up in operation, with automatic maintenance of the effective temperature of the heating medium within limits reduced to a negligible factor of variation.

Other objects and advantages will be apparent in the detailed description of the invention hereinafter set forth.

In the pasteurization of milk the primary object is the destruction of pathogenic bacteria. Among the species of pathogenic bacteria carried by milk sufficiently often to deserve notice, the bovine tubercle bacillus is the most resistant to heat. Many experiments have been made in laboratories by bacteriologists to determine the amount of heat required to kill bacteria. Since the germs of bovine tuberculosis are the most resistant of those found in milk, the thermal death points of these germs have been selected as defining the limits of commercial pasteurization.

Temperature and time are both factors in germ destruction. There is a definite relationship within a considerable range between temperature and time in the killing of germs. In the case of bovine tuberculosis it has been demonstrated that the boiling point of water (212° F.) for a few seconds, and as low as 136° F. for 30 minutes, will both effectively destroy these germs. There is a range of temperatures from 212° F. to 136° F., and of time periods from 5 seconds to 30 minutes, which can be charted, forming a smooth curve in which are included all of the temperatures and time periods at which bovine tubercle bacilli are killed within the range.

Health authorities have selected 142° F. as the minimum temperature and 30 minutes as the minimum time period to define the process of pasteurization. This definition ensures the destruction of bovine tubercle bacilli by a considerable margin. It also ensures the destruction of all other pathogenic bacteria carried by milk which are less resistant to heat. This process of pasteurization also kills the majority of non-pathogenic germs found in milk commonly originating from dust and dirt and unclean utensils.

On the other hand, successful pasteurization must give consideration to the effects of heat on the milk itself. Too much heat causes serious chemical and physical changes. Even the moderate heat of pasteurization, according to the above definition, may cause serious damage to the commercial value of the product. This consists in impairing the creaming properties of milk. The rising of cream to the top of standing milk is due to the lighter weight of the butterfat globules as compared to the weight of the milk serum in which they float. Butterfat has a specific gravity of .96 as compared to that of milk serum which is 1.033. Consequently, on standing, the fat rises. But if too much heat is applied to milk, physical changes take place that prevent the rising of fat. These changes are three in number. (1) The albumen of milk is coagulated. This corresponds to white of egg, and when coagulated tends to thicken the milk. (2) The casein is partially coagulated. Even a small amount of coagulated casein thickens milk to a marked extent. (2) Butterfat globes are expanded by heat, and large ones burst and produce smaller ones. Consequently, in milk overheated, the butterfat globules are reduced in size. This reduction in size greatly increases surface friction. Therefore, small fat globules do not rise as rapidly as large fat globules. The coagulation and the smaller globules together reduce the creaming properties so that overheated milk shows a smaller volume of cream in its upper portion than milk not overheated.

The temperature at which these physical changes begin to take place is 145° F. for 30 minutes. This is only 3° above the limit for pasteurization. Therefore, to properly pasteurize it is required to keep the temperature above 142°, and to prevent milk injury it is necessary to heat below 145°. The operators of pasteurizers have a range of less than 3° for performing the process of pasteurization.

Many years of experience in the study of temperature records and the results of laboratory tests for bacteria in milk samples have shown that, while much destruction takes place at 142° F. for 30 minutes, the efficiency of destruction is greatly increased by the use of temperatures only slightly in excess of 142° F. but below 145° F. For examples, if raw milk contains 500,000 bacteria per cubic centimeter, 142° F. for 30 minutes may reduce these to 25,000 per c. c. On the other hand, 143° F. for 30 minutes will cause a further reduction to 10,000 per c. c., 144° F. for 30 minutes furnishes a product containing only 5,000 per c. c., and finally another half degree, viz., 144½° F. for 30 minutes, produces pasteurized milk containing only 1,000 bacteria per c. c. These results are actually being achieved in the daily operation of large pasteurizing factories. The last half degree (from 144° F. to 144½° F.) is a critical temperature at which the maximum destruction can be accomplished. All this is without impairing the creaming properties of milk, because the temperatures are below 145° F. for 30 minutes.

The above considerations then make it obvious that under present standards the most effective pasteurizing process is one which is operated at 144½° F. for 30 minutes. This produces maximum bacterial destruction without impairing creaming properties. But, pasteurization at such precisely maintained temperature as this cannot be performed by any commercial process heretofore produced. It requires precision in the control of temperature and time far more accurate than the variable fluctuations commonly occurring with the methods of heating and temperature control heretofore in use.

As a matter of fact, results of practicing present methods with the best types of commercial apparatus show a regular fluctuation in milk temperatures of at least 3 degrees. The instruments used for temperature control throw the heat on and off, and heat too much and too little. Inspection of recording thermometer charts always shows irregularities of 3 degrees in the best factories, and of much more than that in poorly operated plants. These variations are, of course, reflected in the product, which varies in the volume of cream appearing in the glass bottles in which milk is delivered to consumers, and in the bacteria count determined by laboratory test.

The present commonly used process for heating milk to pasteurizing temperature comprises raising the temperature from storage temperature to holding temperature in one step or stage, by the use of milk heaters which employ hot water as the heating medium, the hot water being circulated about the containers or conduits carrying the milk. Heat is supplied to the water directly by injection of steam thereinto from a jet device located in the heater or in an adjacent supply pipe leading thereto. Intermittent operation of the jet is controlled by the raising and lowering of the milk temperature at the outlet. This action subjects the milk to the maximum variations in temperature caused by the intermittent operation of the steam jets in water adjacent to the milk.

No sharp line has yet been drawn between efficiency in heat transfer and efficiency in temperature control. These are two distinct problems. Efficiency in heat transference may be improved by enlarging the surfaces in contact with the milk, or by greater velocity in the circulation of the heating water. But efficiency in temperature controls means the reduction of temperature variations to a minimum. It is obvious that temperature variations in the heated milk are primarily due to temperature variations in the heating medium itself. If, therefore, in the process of heating, the temperature of the heating medium can be controlled and regulated so that fluctuations do not occur, with a constant heating surface and constant flow of heating medium and of milk, the fluctuations in milk temperature may be eliminated even in a heater that is very inefficient in the transference of heat.

In the heaters now customarily in use, there are not more than 8 square feet of heating surface per thousand pounds of milk per hour. The ratio of heating water to milk where pumps are used is not more than 3 to 1. The well known barrel type heaters, with direct steam jets heating and circulating the water, require a water temperature at least 30° F. higher than the temperature of the heated milk delivered therefrom. Where pumps are used for circulating the steam heated water in the barrel type at a ratio of 3 of water to 1 of milk, the heating is more efficient and the water temperature is only 10° higher than the delivered milk. In the well known tubular type of heaters, wherein water is circulated at this ratio, it is only 6° higher. But in each of these types the water itself fluctuates in temperature from 2° to 4°, on account of the intermittent injection of the steam directly into the water supply entering the heater.

In the practice of my process of heating, I use two heaters of either the barrel type or tubular type connected in tandem. By the use of two heaters instead of one I double the amount of heating surface heretofore commonly utilized in heating milk to approximately the desired temperature for pasteurization. This means that I use 16 square feet per thousand pounds of milk instead of the customary 8. Since in my arrangement the same milk is pumped through both heaters while each heater has its own independent water supply I also double the amount of heating medium. This means double the usual ratio of hot water to milk or 6 to 1 instead of the usual 3 to 1.

There is no serious objection to heat fluctuations in raising the temperature of cold milk, for example, from 40° F. to 120° F. This preliminary step is only a problem of heat transfer. But as the temperature comes up near that of the pasteurizing standard, temperature control becomes increasingly important. It greatly simplifies the problem of precision in final temperature control to supply milk to a second or final heating unit which is already heated to 120° F. or more. There remain only 24° or less through which the milk must be raised. The temperature control apparatus for such second unit is not strained by a large difference between cold milk and heating medium. In numerous experiments I have demonstrated that where milk is heated in only one step from 40° to 144° the variations are much greater than where it is heated in two steps first to 120° F. and then to 144° F. The first unit of the tandem in the two step process does the bulk of the heating with only fair control. But the second unit with much less heating work to do is able to control the temperature within limits that justify the term precision.

Two barrel heaters may be connected in tandem. The first barrel unit may be heated with either a direct connected steam jet in its jackets or with a pump supplying hot water. In accordance with my invention, the second unit must be supplied with water heated by a dual process in a double tank system as disclosed herein, under accurate temperature control. Or a barrel heater may be used as the first unit and a tubular heater as the second unit. Or two tubular heaters may be connected in tandem, the latter arrangement being that which I have selected for illustration in my copending application, Serial No. 295,650, filed July 27th, 1928, in which I claim the apparatus for practicing my invention.

Precision heating, according to my invention, may be accomplished with either of the variable arrangements, provided the first unit raises the temperature of the milk to 120° F. or more, and the second unit is supplied with heating water the temperature of which is first accurately controlled in accordance with my invention. In all of these tandem arrangements under these conditions the heated milk can be kept within a variation of .2° F. at the outlet.

The advantages of my invention, whereby precision heating of milk may be accomplished with temperature control within the range of less than one-half of one degree F., arise especially from: (1) the provision of two heating stages, in one of which a great temperature change is roughly accomplished, and in the other of which a small temperature change is effected with precise uniformity in final temperature. (2) the provision for precise regulation of the temperature of the heating medium supplied to the final milk heating stage, whereby heat is intermittently applied to a portion of the heating medium and that portion thereafter intermixed with a greater portion of the medium held in supply, the intermixture effecting the smoothing out of temperature variations due to intermittent heat application, and (3) a sufficient heating surface area and volume relation between milk and heating medium to assure an efficient exchange of heat from medium to milk.

A diagrammatic representation of a preferred form of apparatus, by which my invention may be practiced, is illustrated in the accompanying drawing. It will be understood, however, that various changes in form, construction and arrangement may be made by those skilled in the art without departing from the scope and spirit of the invention as expressed in the appended claims.

In the drawing, the numeral 1 indicates the first one of two like units of conventional tubular milk heater, the second unit being indicated at 2. Each unit comprises a series of milk conducting tubes 3 positioned within annularly spaced enclosing tubes 4, the tubes being endwardly supported in suitable standards 5. The inner tubes and outer tubes respectively are alternately connected at their ends by means of return bends 6, of conventional form, providing continuous passages respectively for milk and heating water progressing through the series of double tubes, milk being conducted through the inner tubes and hot water through the annular spaces between the inner and outer tubes. Such heater construction is well known in the art, and further detailed description is not necessary herein. Milk to be heated for pasteurization is customarily pumped from suitable storage tanks (not shown) at a uniform rate into and through the heater, and thence into suitable containers (not shown) for holding the hot milk during the prescribed period of time.

In the arrangement herein illustrated, the milk is brought to the first heater unit through a pipe 9, passing therefrom down through the series of inner tubes 3 and being delivered to the second heater unit through the connecting pipe 10, from whence the milk passes down through the inner tubes of the second unit and is discharged through a pipe 11 leading to the holding containers.

For indication of temperatures at critical points in the milk passage and in the heating medium circulation conduits, thermometers may be placed therein as indicated at 12 and 13 in the respective hot water inlet connections to the first and second heater units, and at 14 and 15 in the respective milk outlet passages from the first and second heater units.

A source of motive power, preferably an electric motor 16, drives a pair of rotary pumps 17 and 18 for circulating the heating water through the two heater units. The pump 17 discharges into a pipe 19 leading to the water inlet of the first heater unit, and the pump 18 discharges into a pipe 20 leading to the water inlet of the second heater unit. Having passed through the first heater unit 1, the water flows through a return pipe 21 into a water heating tank 22. The circuit for heating water through unit 1 is completed by a pipe 23 leading from tank 22 to the suction inlet of the pump 17. The heating water pumped through heater unit 2 flows therefrom through a return pipe 24 leading into another water heating tank 25. From tank 25 the water flows through a connection 26 into a relatively large temperature smoothing reservoir or mixing tank 27, from which the heating water circuit for unit 2 is completed by a pipe 28 leading to the suction inlet of the pump 18.

Provision is made for filling the two independent heater water circuits with water from a source of supply by means of pipes 29 and 30 respectively connected into the pump suction lines 23 and 28 through hand control valves 31 and 32. Overflow from the two circuits may occur, resulting from the accumulation of condensation from the steam heaters hereinafter described, through the overflow pipes 33 and 34 respectively opening into the tanks 22 and 25.

Heat is introduced into the heating water of the two circuits preferably by the injection of live steam, which is accomplished within the two water heating tanks 22 and 25. Any suitable type of steam injector may be employed, one of which is indicated in each tank 22 and 25 at 35 and 36 respectively. The injectors 35 and 36 are respectively connected through the walls of the tanks with steam supply pipes 37 and 38. The latter are controlled respectively by regulating valves 39 and 40 having automatic thermo control as hereinafter described. For expediting initial heating of the water to operating temperatures, by-pass connections 41 and 42 are provided around the respective regulating valves 39 and 40, the by-passes being controlled by hand valves 43 and 44.

The steam regulating valves 39 and 40 may be any of several well known types, such as the electro-magnetically actuated type having electric connections through conductors 48 and 49 with automatic thermo-controlled electric switching devices 50 and 51 independently effective to actuate the respective regulating valves. The devices 50 and 51 include thermometers of which the connections 52 and 53 respectively lead to fluid expansion bulbs 54 and 55 positioned in the water heating tanks 22 and 25, and are respectively provided with means for setting a predetermined temperature for the water in the respective tanks 22 and 25, above which the devices are independently automatically operable to close the respective regulating valves 39 and 40, and below which the valves are opened for the admission of steam to the respective heating tanks. The devices 50 and 51 may be of any of several types of automatic temperature controls well known in the art.

In operation, the temperature controls 50 and 51 are set at any desired temperatures. From numerous experimental tests I have found that a desirable choice of temperatures is to set the controller for the steam valve 39 at 130° F. and the controller for the steam valve 40 at 145° F. With the motor 16 in operation, the pumps 17 and 18 drive water through the tubular heater units 1 and 2. The thermometers 12 and 13 show the temperatures of the water from the pumps to both heater units. With the water heated to operating temperatures, the valves 39 and 40 operate intermittently to admit and cut off steam to the tanks 22 and 25. When either valve is open it remains open until the steam heats the water in its respective tank above the temperature at which the controller is set. By going above this point the controller receives the impulse which closes the steam valve. The steam valve then remains closed until the temperature of the water in the tank is reduced below the point at which the controller is set. This reduction results from the return of the heating water from the heater unit, where it has given up a portion of its heat to the cold milk. When the temperature in the tank has been carried far enough below the point at which the controller is set, it receives the impulse which causes it to open the steam valves, and steam is again injected into the water. This intermittent action of steam valves 39 and 40 is very frequent, occurring for example twice a minute. The range or swing of temperature necessary to cause the controllers to act, is from 1° to 2° above and below the temperatures at which they are set. Consequently the water in tanks 22 and 25 is alternately hotter and colder than required.

The thermometer at 12, which shows the temperature of the water from tank 22 and pump 17, will be observed to continually fluctuate from 2° to 4° with an average variation of at least 3°. As a consequence of the variations in water temperature, the milk which is heated in heater unit 1 shows similar fluctuations in temperature, as observed in thermometer 14 at the milk outlet. The variations in milk temperature are not quite so large as the water variations, but they range from 1° to 3° with an average of at least 2°.

Tank 22 and heater unit 1 correctly represent the single stage commercial milk heaters formerly in use. The variations in water temperature of the water from tank 22 at thermometer 12 averaging 3° F., and of milk temperature at thermometer 14 averaging 2° F., correctly represent the variations in water and milk temperatures in former milk heaters of good type. Tank 22 and heater unit 1 with steam controller 50, and the temperature variations which are unavoidable from the intermittent action of steam valve 39, correctly represent the present state of the art of milk heating.

The milk from heater unit 1 is next carried to the second heater unit 2. Unit 2 is supplied with hot water tanks 25 and 27. The heating process accomplished by the combination of tanks 25 and 27 constitute a novel system of hot water supply. The capacity of tank 25 is, for example, 30 gallons. The capacity of tank 27 is 180 gallons or 6 times the capacity of tank 25. The water from tank 25 flows by gravity and by pressure through outlet 26 into tank 27. The pipe 26 conveying water from tank 25 to tank 27 is discharged close to one end of tank 27. The supply pipe 28 for pump 18 is so located that its outlet from tank 27 is at the opposite end of tank 27 from the inlet 26. Consequently the water discharged from tank 25 has to travel the entire length of tank 27 to reach pump 18. In this way the water discharged from tank 25 is thoroughly mixed with the entire contents of tank 27.

The temperature of the water discharged from tank 25 fluctuates from 2° to 4° and has an average fluctuation of 3° from the same causes previously described in connection with tank 22. The relations of controller and steam valve in the case of tank 25 are identical with those described for tank 22. Consequently, tank 25 is constantly discharging water into tank 27 which alternately fluctuates above and below the temperature at which its controller is set. By numerous experiments I have determined that a mixture within tank 27 of six complete discharges from tank 25 results in smoothing out the initial temperature variations to the extent that the temperature of the intermixed body of water in tank 27 is practically that uniformly desired, and that continued operation results in maintaining constant temperature in tank 27 at the desired degree for which the controller is set. It is obvious that a thorough mixture of equal parts of water that is 2° F. above the desired temperature with water 2° F. below the desired temperature should produce water at about the desired temperature.

In practice this is what actually occurs. A sensitive thermometer at 13, which is the hot water inlet to heater unit 2 coming from tank 27, shows in numerous experimental tests a maximum variation of only .4 of a degree Fahrenheit and an average variation of only .2° Fahrenheit. By the use of mixing tank 27, the temperature variations of tank 25 are practically eliminated.

This precise control of water temperature furnishing heat to heater unit 2 results in a perfect and precise control of the temperature of the milk passing through this second stage heater. Thermometer 15 shows the temperature of the milk at the outlet of the second heater unit, which is the finished product of the entire process. Numerous experimental observations of this thermometer have shown that the temperature of the milk at this outlet under the conditions named has a maximum variation of .2° Fahrenheit and an average variation of .1° Fahrenheit. This is as close precision as can be read with the best type of thermometers.

By this process the fluctuations in heating water supply of commercial milk heaters is reduced from 4° Fahrenheit and of milk at the outlet from 3° Fahrenheit to .2° Fahrenheit.

The milk may come to the first heater unit from a cold storage tank with a temperature of 40° F. or less. With the control 50 for tank 22 set at 130° F., and pump 17 pumping water at a rate 3 times that of the milk passing through heater unit 1, the latter will raise the temperature of the milk from 40° F. to 124° F. or within 6° F. of the average water temperature.

With milk entering heater unit 2 at 124° F., and control 51 for tank 25 set at 145°, and pump 18 operating at 3 times the rate of flow of the milk, unit 2 will raise the temperature of the milk from 124° F. to 144.5° F. or within .5° F. of the water temperature. Thus the first heater unit raises the milk temperature 84° F. while the second heater unit raises it only 20.5° F. The object of dividing the work between the two heater units in a two step process, is to separate the work of mere temperature raising from the work of precision temperature regulation. The task of temperature regulation within precision limits is much easier where the range through which the milk must be lifted is small than where it is large. A large range such as a lift of 100° F. or more subjects the controlling devices to a much greater strain than a small range or lift of only 20° F. My tests with the same controlling devices have repeatedly shown a direct relation between the extent of the range and extent of variations. With large range, variations are great. With small range, variations are small.

In this process there is a novel system of temperature regulation. The ordinary temperature control devices receive their impulses from the expansion and contraction of liquids or gases such as mercury, ether, etc., which are contained in the bulbs and tubing included in such devices. The common practice heretofore has been to attach the bulbs of these expansion lines to milk tanks or milk pipes so that they are effected by the temperature changes in the milk itself. Much more precise control can be accomplished by inserting these bulbs in the water itself. By placing the bulbs in the water, the temperature changes in the water act directly on the regulators and cause them to provide more steam or less steam as may be required to keep the water temperature uniform. Instead of changing the water temperature to compensate for changes in milk temperature, which is what occurs when the control bulbs are in the milk, better results are attained by keeping the water temperatures as uniform and unchanged as possible, ignoring entirely any temperature differences in the milk. By placing the bulbs of the control devices in the water of both of my small water heating tanks, the temperatures of the waters in these tanks are kept close to the points at which I set the indicators on the temperature scale. It is such regulation of water temperature that makes precision heating possible.

With fixed water temperatures, fixed pumping rate of water to heaters, a fixed volume ratio of milk to water, sufficient heating surface, precision heating by my process is guaranteed. For example, with the temperature of the water supply of the first heater unit set at 130° F. and of the second heater unit set at 145° F., and a combined volume ratio of milk one to water six, and with 16 square feet of heating surface to 1000 lbs. of milk per hour, under the conditions named, precision heating within two tenths of a degree F. is guaranteed. Of course, the rated capacity of the equipment must not be exceeded. An excess of milk will obviously upset the ratio and reduce the relative amount of heating surface. In no event can milk be heated hotter than the water. Any capacity less than the rated capacity of the equipment can be taken care of by this arrangement. If for example the rated capacity of the equipment for heating milk is 6000 lbs. per hour and with the temperatures of the two water supplies set at 130° F. and 145° F., and a volume flow ratio of milk 1 to water 6, the temperature of the milk at the final outlet is 144.5° F. If then the flow of milk is reduced to one half the capacity, or 3000 lbs. per hour, the apparatus quickly adjusts itself and will control the temperature with the same precision but with an increase of temperature at the outlet of a fraction of a degree, so that this smaller flow of milk will have an outlet temperature slightly above 144.5° F.

The process of my invention, as herein described, can take care of all variations in rates of flow of milk from maximum capacity to zero with a range of not more than one degree at the outlet. Within this range the variation will be not more than two tenths of one degree for any constant rate of flow.

It will be obvious, of course, that while I have hereinbefore described the process as one for progressively raising the temperature of milk passing through the successive heating stages, a change in the predetermined temperatures to which the heating circuits are regulated would enable raising the milk temperature to a relatively high degree in the first stage and then substantially lowering that temperature in the second stage to a final degree at which the heating is finished with precision results. Also, it will be obvious that wherever precision cooling is desirable, the process may be adapted thereto by substituting cold water for hot water under similar control for temperature regulation. It will be understood that in the above description and in the following claims reference to heating of the heat exchange medium applies equally to cooling the medium in similar manner.

I claim as my invention:

1. The process of maintaining uniform temperature in a circulating heating medium having heat exchange relation with a flowing body of milk, comprising, conducting said medium through a relatively small reservoir wherein variations of temperature from said uniform temperature automatically effect the intermittent interjection of heating fluid thereinto, conducting said medium through a relatively large reservoir wherein successive portions of medium flowing from said small reservoir are intermixed to effect uniform temperature therein, and thence conducting said heating medium into heat exchange relation with said milk.

2. The process of heating milk to pasteurization temperature comprising, conducting said milk serially through a pair of heating stages, applying heat exchange medium to said milk in said stages, the medium in each stage being circulated independently of that in the other stage, maintaining approximately uniform temperature of the medium applied in the first of said stages by interjecting heat tempering fluid thereinto responsively to changes in temperature of the medium returning from said first stage, and maintaining precisely uniform temperature of the medium applied in the second of said stages by interjecting heat tempering fluid thereinto responsively to changes in temperature of the medium returning from said second stage and passing said medium after receiving said fluid through a reservoir for the uniform intermixture of substantial quantities thereof before application to said milk.

3. The process of heating milk for pasteurization comprising, conducting said milk in heat-exchange relation with a successively arranged pair of heating water circuits, approximately maintaining a predetermined temperature in the first of said water circuits by interjecting steam thereinto automatically effected by variations in temperature of the return water, and precisely maintaining a predetermined temperature in the second of said water circuits by interjecting steam thereinto automatically effected by variations in temperature of the return water and thereafter intermixing successive portions of said water to eliminate the temperature fluctuations therein caused by said steam interjection.

In witness whereof, I have hereunto attached my signature.

CHARLES E. NORTH.